(12) United States Patent
Holleczek et al.

(10) Patent No.: US 11,697,401 B2
(45) Date of Patent: Jul. 11, 2023

(54) DEVICE AND METHOD FOR CLEANING A PARTIAL REGION OF A HOUSING SURFACE

(71) Applicant: Robert Bosch GmbH, Stuttgart (DE)

(72) Inventors: Annemarie Holleczek, Stuttgart (DE); Joao Costa, Trofa (PT); Joao Oliveira, Fao (PT); Tobias Peterseim, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 401 days.

(21) Appl. No.: 16/767,103

(22) PCT Filed: Nov. 21, 2018

(86) PCT No.: PCT/EP2018/082013
§ 371 (c)(1),
(2) Date: Aug. 7, 2020

(87) PCT Pub. No.: WO2019/105817
PCT Pub. Date: Jun. 6, 2019

(65) Prior Publication Data
US 2020/0377059 A1    Dec. 3, 2020

(30) Foreign Application Priority Data
Nov. 30, 2017  (DE) ............... 10 2017 221 537.2

(51) Int. Cl.
*B60S 1/56* (2006.01)
*B60S 1/52* (2006.01)
(Continued)

(52) U.S. Cl.
CPC . *B60S 1/56* (2013.01); *B60S 1/52* (2013.01); *G01S 17/88* (2013.01); *G01S 2007/4977* (2013.01)

(58) Field of Classification Search
CPC ..................................... B60S 1/52; B60S 1/56
See application file for complete search history.

(56) References Cited

U.S. PATENT DOCUMENTS

| 5,125,342 A | 6/1992 | Hara |
| 2005/0141996 A1 | 6/2005 | Bernard |

(Continued)

FOREIGN PATENT DOCUMENTS

| CN | 1272428 A | 11/2000 |
| CN | 201205263 Y | 3/2009 |

(Continued)

OTHER PUBLICATIONS

International Search Report dated Mar. 8, 2019 in connection with International Application No. PCT/EP2018/082013.

*Primary Examiner* — Michael D Jennings
(74) *Attorney, Agent, or Firm* — Norton Rose Fulbright US LLP; Gerard Messina

(57) ABSTRACT

A device for cleaning at least a partial region of a housing surface. The device includes a first structure having an outer surface and an inner surface, the outer surface being situated opposite to the inner surface, the inner surface being able to be disposed on the partial region of the housing surface, and a second structure having an outer surface and an inner surface, the outer surface of the second structure being situated opposite to the inner surface of the second structure, wherein the inner surface of the second structure is disposed on the outer surface of the first structure, the first structure being deformable along a first axis by a fluid which is able to be conducted between the first structure and the second structure and the second structure being movable along a second axis, the second axis being disposed perpendicular to the first axis.

14 Claims, 6 Drawing Sheets

(51) Int. Cl.
*G01S 17/88* (2006.01)
*G01S 7/497* (2006.01)

(56) References Cited

U.S. PATENT DOCUMENTS

| | | | |
|---|---|---|---|
| 2014/0036132 A1* | 2/2014 | Pawlowski | G03B 17/02 |
| | | | 348/335 |
| 2019/0003895 A1* | 1/2019 | Krishnan | B60R 11/04 |
| 2019/0210570 A1* | 7/2019 | Schmidt | B60S 1/56 |
| 2019/0275991 A1* | 9/2019 | Schmidt | B60S 1/56 |

FOREIGN PATENT DOCUMENTS

| | | |
|---|---|---|
| DE | 3512109 A1 | 10/1986 |
| DE | 102014220257 A1 | 4/2016 |
| DE | 102016006039 A1 | 11/2016 |
| EP | 790125 A1 | 8/1997 |
| GB | 2535862 A1 | 8/2016 |
| JP | H07043829 Y | 4/1992 |
| JP | H09120513 A | 5/1997 |
| JP | H1069616 A | 3/1998 |
| JP | H11300942 A | 11/1999 |

\* cited by examiner

DEVICE AND METHOD FOR CLEANING A PARTIAL REGION OF A HOUSING SURFACE

FIELD

The present invention relates to a device and a method for cleaning a partial region of a housing surface.

BACKGROUND INFORMATION

Great Britain Patent Application No. GB 2535862 A1 describes a cleaning film disposed on a housing of an optical sensor, the film being movable using a gear.

German Patent Application No. DE 102016006039 A1 describes a cleaning system with two wiping elements for cleaning an optical sensor.

The disadvantage here is that these systems are not suitable for a sensor which has a large range of vision of >180°, in particular 360°, since the availability of the sensor depends on the wiping speed of the cleaning device. Another disadvantage is that the cleaning device is permanently disposed on the sensor protector.

An object of the present invention is to increase the availability of an optical or optoelectronic sensor.

SUMMARY

In accordance with an example embodiment of the present invention, the device for cleaning at least a partial region of a housing surface comprises a first means (i.e., a first structure) having an outer surface and an inner surface, the outer surface of the first means being situated opposite to the inner surface of the first means. The inner surface of the first means may be disposed on the partial region of the housing surface. The device comprises a second means (i.e., a second structure) having an outer surface and an inner surface, the outer surface of the second means being situated opposite to the inner surface of the second means. According to an example embodiment of the present invention, the inner surface of the second means is disposed on the outer surface of the first means, the first means being deformable along a first axis by a fluid which can be conducted between the first means and the second means. The second means may be moved along a second axis, the second axis being disposed perpendicular to the first axis. In other words, this is a cleaning device in which the second means represents a retaining device having a deformable means (structure) disposed on the inner surface thereof. The inner surface of the retaining device faces the object to be cleaned. The retaining device is able to travel, shift or move in the direction of a longitudinal axis of the object to be cleaned. Due to the fact that the inner surface of the second means is disposed on the outer surface of the first means, the first means and the second means are mechanically connected to one another. Since the second means functions as a retaining device, the first means is also able to be moved along the second axis, i.e., the first means is moved together with the second means.

The advantage here is that cleaning is performed via direct contact of the first means with the partial region of the housing surface.

In a further development of the present invention, the first means is designed as a partial ring, in particular as a half-ring.

The advantage to this is that a large portion of the housing surface can be cleaned at once.

In another embodiment of the present invention, first means comprises at least one opening designed for emitting the fluid.

An advantage to this is that the fluid may be used to support the mechanical cleaning process.

In a further development of the present invention, the at least one opening is arranged acentrically. In other words, the opening is located parallel to the first axis on the first means, i.e. not in the center of the bulge of the first means.

This provides the advantage that the bulge of the first means functions as a drying unit of the partial region of the housing surface, i.e., the bulge functions as a means to wipe away the fluid.

In one embodiment, the at least one opening comprises a nozzle. The nozzle is attached for example in the membrane or directly on the retainer.

This provides the advantage that the fluid may be applied at a higher pressure to the surface to be cleaned.

In accordance with an example embodiment of the present invention, The optoelectronic sensor comprises a housing which has at least a partial region which is transparent to the light of the optoelectronic sensor, and a device for cleaning a surface of the partial region, the device comprising a first means having an outer surface and an inner surface, the outer surface of the first means being situated opposite to the inner surface of the first means. The inner surface of the first means may be disposed on the surface of the partial region. A second means has an outer surface and an inner surface, the outer surface of the second means being situated opposite to the inner surface of the second means. According to the present invention, the inner surface of the second means is disposed on the outer surface of the first means, the first means being deformable along a first axis by a fluid which can be conducted between the first means and the second means. The second means may be moved along a second axis, the second axis being disposed perpendicular to the first axis.

An advantage to this is that the availability of the sensor is increased since the dirt cannot accumulate on the protector, for example the glass cover.

In a further development, the second means is connected to a drive device for moving the second means along the second axis.

The vehicle comprises a device for cleaning at least a partial region of a housing surface, the device comprising a first means with an outer surface and an inner surface, the outer surface of the first means being situated opposite to the inner surface of the first means. The inner surface of the first means can be disposed on the partial region of the housing surface. A second means has an outer surface and an inner surface, the outer surface of the second means being situated opposite to the inner surface of the second means. According to the invention, the inner surface of the second means is disposed on the outer surface of the first means, the first means being deformable along a first axis by means of a fluid which can be conducted between the first means and the second means. The second means is disposed on the vehicle roof or hidden in the vehicle roof.

This provides the advantage that the second means is rigidly connected to the vehicle and that cleaning of the optoelectronic sensor or the housing surface thereof may be carried out regularly.

In a further development, the second means is connected to a drive device designed for moving the second means along a second axis, the second axis being disposed perpendicular to the first axis.

This provides the advantage that a part of the optoelectronic sensor housing surface may be cleaned during vehicle operation without the sensor having to retract.

The example method according to the present invention for cleaning at least a partial region of a housing surface comprises conducting a fluid between a first means and a second means so that the first means bulges in the direction of the partial region of the housing surface and further comprises moving the second means along a second axis, the second axis being disposed perpendicular to the first axis.

In a further development, the fluid is applied onto the partial region of the housing surface via openings in the first means, and the partial region of the housing surface is dried by bulging the first means.

Further advantages can be found in the description below of exemplary embodiments in the figures.

BRIEF DESCRIPTION OF THE DRAWINGS

The present invention is explained below with reference to preferred specific example embodiments and the figures.

DETAILED DESCRIPTION OF EXAMPLE EMBODIMENTS

Figure 1:
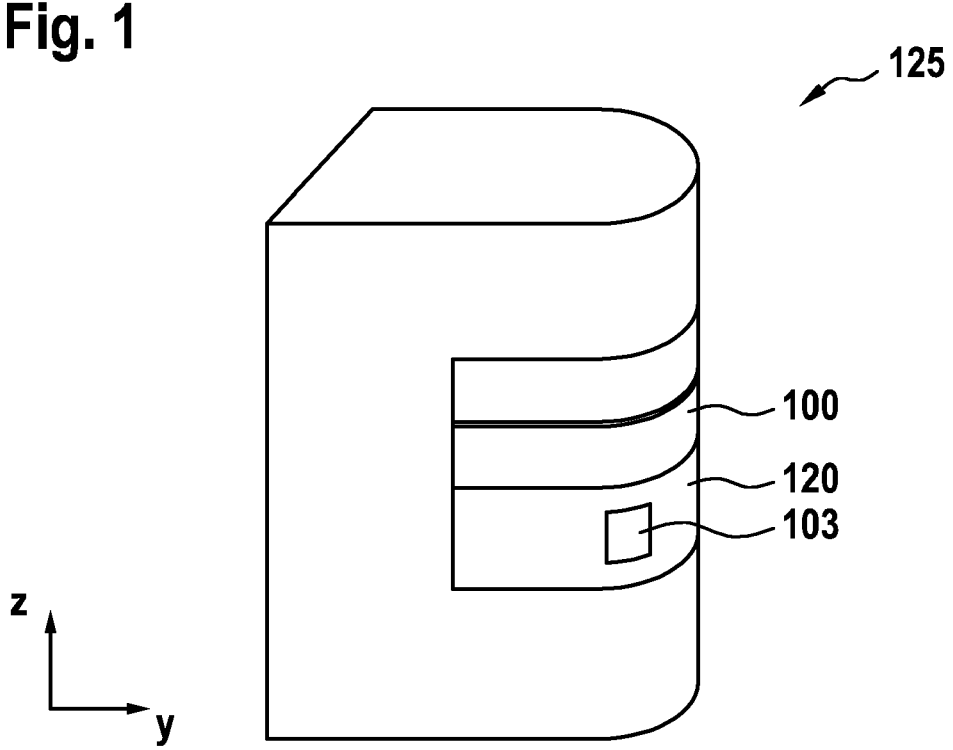
FIG. 1 shows a device for cleaning at least a partial region of a housing surface in accordance with an example embodiment of the present invention.

FIG. 1 shows a housing 125 of an optoelectronic sensor 103. The housing 125 comprises a partial region 120 which is transparent or permeable to the light issued from the optoelectronic sensor 103, for example a glass cover. A device 100 for cleaning the partial region is disposed on the partial region 120. The device 100 may be moved or shifted in the longitudinal direction of the housing 125, i.e., in the z-direction.

Figure 2:
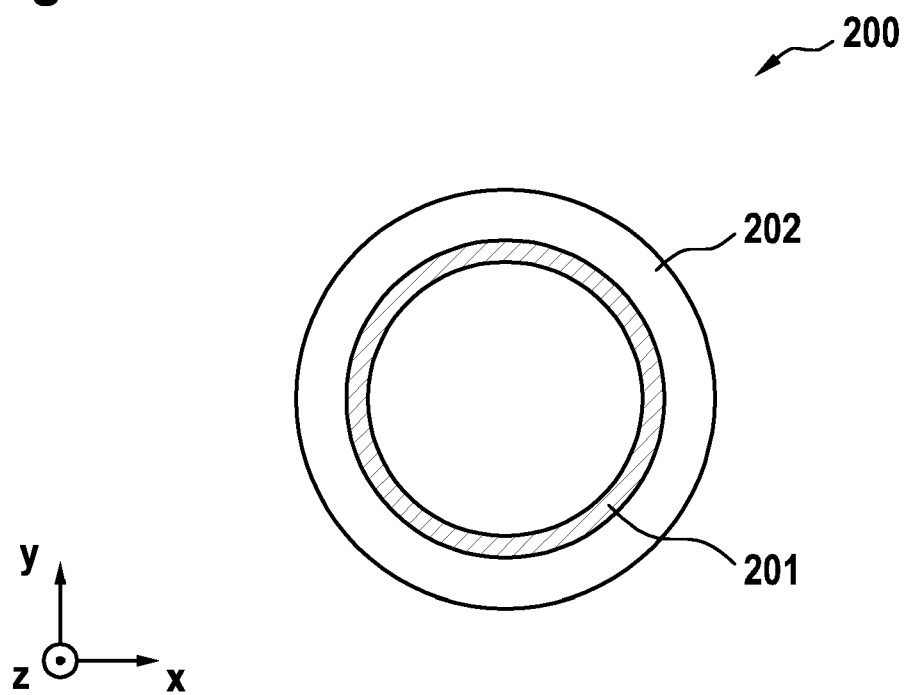
FIG. 2 shows a top view of a device for cleaning the partial region of the housing surface, which in this case is a peripheral outer surface of a symmetrical body, in accordance with an example embodiment of the present invention.

FIG. 2 shows a top view of device 200 for cleaning at least a partial region of a housing surface. In the present case, the partial region of the housing surface to be cleaned is a peripheral outer surface of a symmetrical body in which a sensor is installed. Device 200 comprises a first means 201 and a second means 202. First means 201 is disposed on an inner surface of second means 202, the inner surface of second means 202 facing in the direction of the housing surface to be cleaned.

First means 201 may be deformed in the direction of a first axis x, or rather first means 201 may be deformed perpendicular to the inner surface of the second means. First means 201 comprises elastomers, for example rubber, caoutchouc, silicone or deformable plastics. Second means 202 functions as a retainer for first means 201 and comprises metal or rigid plastic, for example. In a first exemplary embodiment, at least two devices 200 may be disposed along a second axis z one above the other, the second axis z being disposed perpendicular to the first axis. Thus, the first device may serve to apply the cleaning fluid and the second device may serve to dry the cleaning fluid. In a second exemplary embodiment, first means 201 and second means 202 are in the form of partial rings, the center points of the partial rings coinciding and being located on the second axis. In a third exemplary embodiment, first means 201 and second means 202 are in the form of rings, the center points of the rings coinciding and being located on second axis z. In the ring-like embodiment of first means 201 and second means 202, second axis z is therefore the longitudinal axis of first means 201 and second means 202 and first axis x represents the radial axis. In other words, a substantially ring-like cleaning system is used which cleans the glass cover along the vertical axis of the housing. This means that sensors having a horizontal field of vision may be cleaned quickly.

Figure 3:
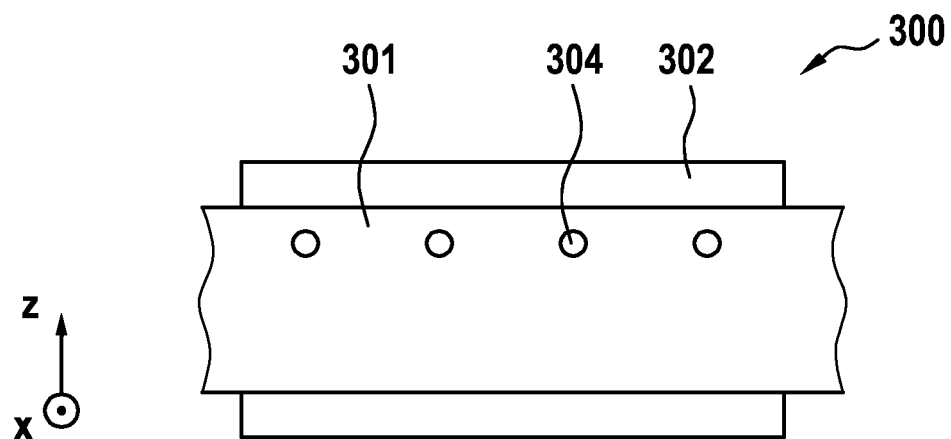
FIG. 3 shows a side view of the device for cleaning the partial region of the housing surface, in accordance with an example embodiment of the present invention.

FIG. 3 shows a side view of device 300 for cleaning the partial region of the housing surface which is permeable to the light of the sensor. Device 300 depicts first means 301 and second means 302. Second means 302 functions as a retainer for first means 301. First means 301 has at least one opening 304 from which the fluid may exit. The openings can be located on first means 301 acentrically, i.e., not along a center line of first means 301, but shifted laterally relative to the center line, in other words they may be located above or below the center line of first means 301 parallel to the second axis z. If the openings are located below the center line, the fluid is able to flow downward due to the force of gravity. The openings may also comprise nozzles, in particular spray nozzles, which are disposed at a defined angle relative to the object to be cleaned. The fluid is thereby applied not in the direction of gravitation, but rather at a defined angle relative thereto. This means that the wetting of the partial region of the housing surface due to the effect of the gravitational force is greater and thus a larger surface area may be cleaned using a small number of spray nozzles. FIG. 3 respectively shows laterally a bulge of first means 301.

Figure 4:
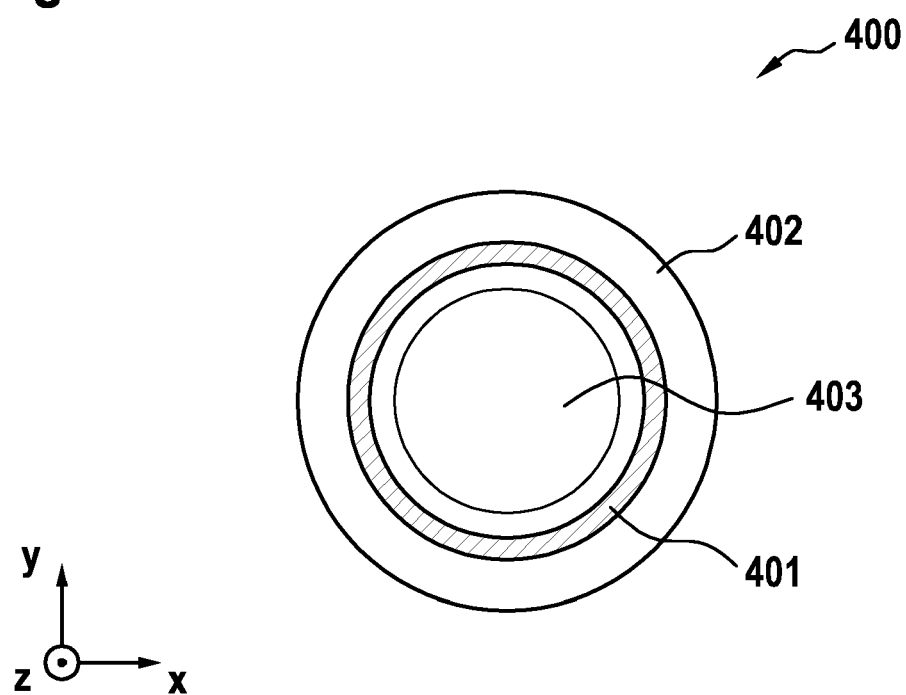
FIG. 4 shows a top view of an optoelectronic sensor comprising the device for cleaning the partial region of the housing surface, which in this case is the peripheral outer surface of a symmetrical body, om accordance with an example embodiment of the present invention.

FIG. 4 shows a top view of an optoelectronic sensor including device 400 for cleaning the partial region of the housing surface. In the present case, the partial region of the housing surface to be cleaned is a peripheral outer surface of a symmetrical body 403 in which a sensor is installed. The symmetrical body 403 is permeable to light or translucent or transparent to light, which is radiated by the optoelectronic sensor, and is made for example of a plastic such as polycarbonate or PMMA, or of glass. Symmetrical body 403 may be designed as a cylinder having a symmetrical base area, for example in a circular or elliptical shape, or as a cuboid. First means 401 and second means 402 are adapted to the contour of the outer surface to be cleaned. If symmetrical body 403 is a cylinder with a circular base surface, first means 401 and second means 402 are designed as at least partial rings, in particular half-rings. If symmetrical body 403 is a cuboid, first means 401 and second means 402 are designed in a rectangular shape, the two means not necessarily encompassing the entire periphery. If first means 401 and second means 402 do not encompass the entire periphery, only one outer surface of the cuboid may be cleaned, for example. First means 401 may have a lateral distance to the object to be cleaned.

Figure 5A:
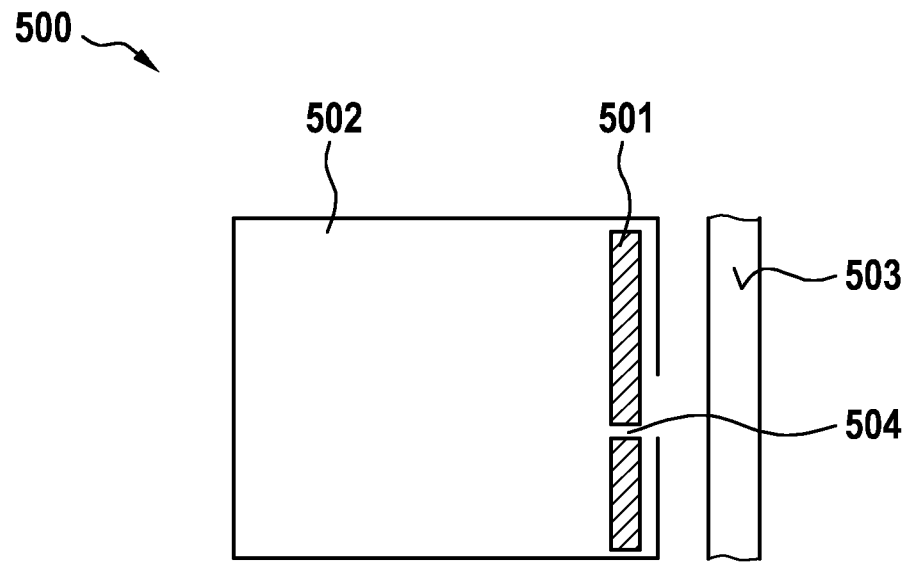
FIG. 5a shows a side view of the device for cleaning the partial region of the housing surface, in accordance with an example embodiment of the present invention.

FIG. 5a shows a side view of the device for cleaning the partial region of the housing surface in an initial position, together with first means 501 and second means 502 and the partial region of the housing surface 503 to be cleaned. The initial position here is meant as the position in which no fluid is being conducted. In other words, no pressure is exerted on first means 501 so that device 500 does not touch the surface to be cleaned. In this state, first means 501 is at a distance from the object to be cleaned in the direction of first axis x. In this initial position, the device may be moved or travel along second axis z over the surface to be cleaned without touching it.

Figure 5B:
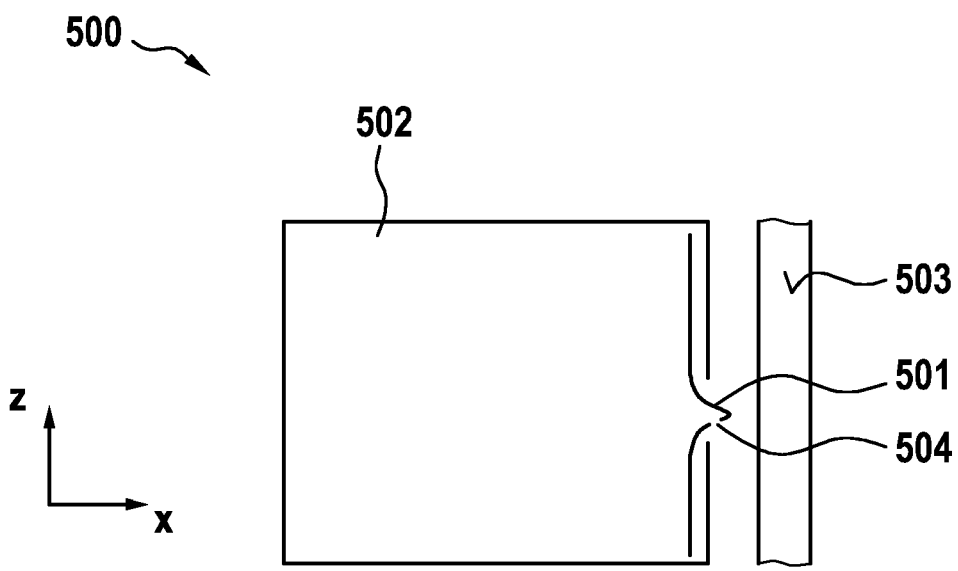
FIG. 5b shows a side view of the bulged device for cleaning the partial region of the housing surface, in accordance with an example embodiment of the present invention.

FIG. 5b shows a side view of the bulged device for cleaning the partial region of the housing surface, together with first means 501 and second means 502 and the surface 503 to be cleaned. Here, first means 501 has a bulge in the direction of first axis x, the bulge being generated using a fluid conducted between first means 501 and second means 502. In other words, pressure is exerted on first means 501 by the fluid so that first means 501 may touch the surface to be cleaned. Optionally, first means 501 may have an opening so that fluid may be conducted onto the peripheral outer surface. The fluid may be gaseous, such as air, or a liquid, such as water, with or without cleaning additives. The fluid may be pre-heated so that ice on the peripheral surface may be removed as well.

In an exemplary embodiment, second means 502 is connected to a drive device designed for moving second means 502 along second axis z. Second means 502 may be mechanically driven using a linear guide, a belt or cogged belt, a gear, a rotation of the gear using a motor, a threaded spindle, or a hydraulic drive. In the case of a hydraulic drive, a fluid or a gas is introduced into a cylinder under pressure. In this cylinder, there is a piston which is moved translationally in a straight line by the applied pressure. Second means 502 is disposed on this piston. The linear guide comprises a magnetic linear drive, for example, similar to the principle of a magnetically levitated train. A guide rail is provided which includes either a first permanent magnet or preferably electromagnets. Second means 502 comprises a second magnet, in particular a permanent magnet, which is of opposite polarity to the first permanent magnet or electromagnet. Second means 502 levitates on the guide rail due to the different polarity of the magnets. Second means 502 is moved by active reversal of polarity.

Figure 6A:
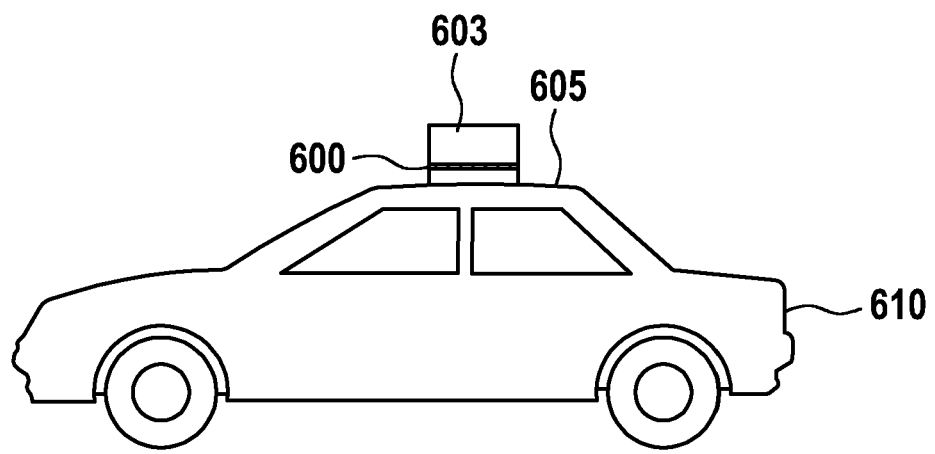
FIG. 6a shows a vehicle having a built-in optoelectronic sensor and a device for cleaning at least a partial region of the housing surface on a vehicle roof, in accordance with an example embodiment of the present invention.

FIG. 6a shows a vehicle 610 including a built-in optoelectronic sensor 603 and a device for cleaning the partial region of a housing surface on a vehicle roof 605. In an exemplary embodiment, second means 602 is disposed on the vehicle roof 605. In another exemplary embodiment, second means 602 is hidden in the vehicle roof 605. In such an arrangement, the object to be cleaned, in this case the housing of the optoelectronic sensor 603, is moved, the object to be cleaned representing a partial region. Second means 602 is rigidly connected to the vehicle roof 605. In other words, the housing is retracted and/or extended for purposes of cleaning. In this case, an arrangement of openings above a center line of the first means is advantageous.

Figure 6B:
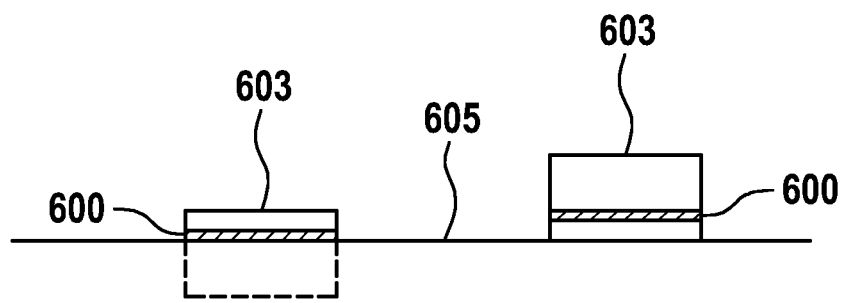
FIG. 6b shows a vehicle roof having a device for cleaning at least a partial region of the housing surface, the object to be cleaned having different positions, in accordance with an example embodiment of the present invention.

FIG. 6b shows a vehicle roof 605 including a device for cleaning the partial region of the housing surface, the object to be cleaned having different positions. On the left side, FIG. 6b shows the housing of the optoelectronic sensor retracted into the vehicle roof, and on the right side the extended housing of the optoelectronic sensor together with the cleaning device.

Figure 6C:
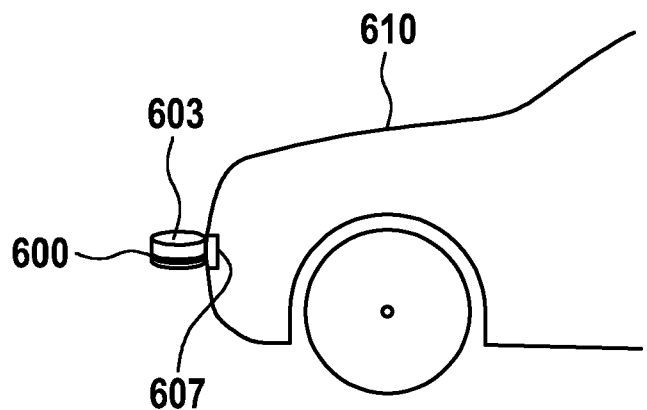
FIG. 6c shows a vehicle having a built-in optoelectronic sensor and a device for cleaning at least a partial region of the housing surface disposed on the fender, in accordance with an example embodiment of the present invention.

FIG. 6c shows a vehicle 610 including a housing of an optoelectronic sensor which is rigidly disposed in the area of the bumper. The device for cleaning the partial region of the housing surface moves along the longitudinal axis of the housing for purposes of cleaning, i.e., along second axis z. In this exemplary embodiment, the first means and the second means are designed either as partial rings or as half-rings, the first means and the second means having the same form and being of substantially the same size.

Figure 6D:
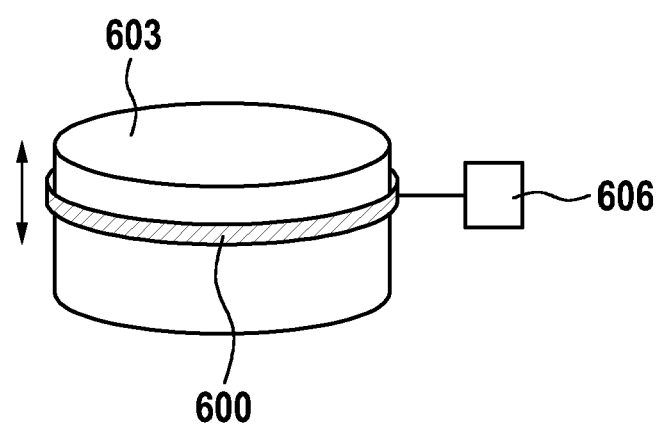
FIG. 6d shows a housing of the optoelectronic sensor having a device for cleaning at least a partial region of the housing surface, and a drive device, in accordance with an example embodiment of the present invention.

FIG. 6d shows the housing of an optoelectronic sensor 603 with the device 600 for cleaning the partial region of the housing surface and a drive device 606 designed to move the cleaning device in the direction of the longitudinal axis of the housing.

The sensors may be lidar sensors or cameras.

Figure 7:
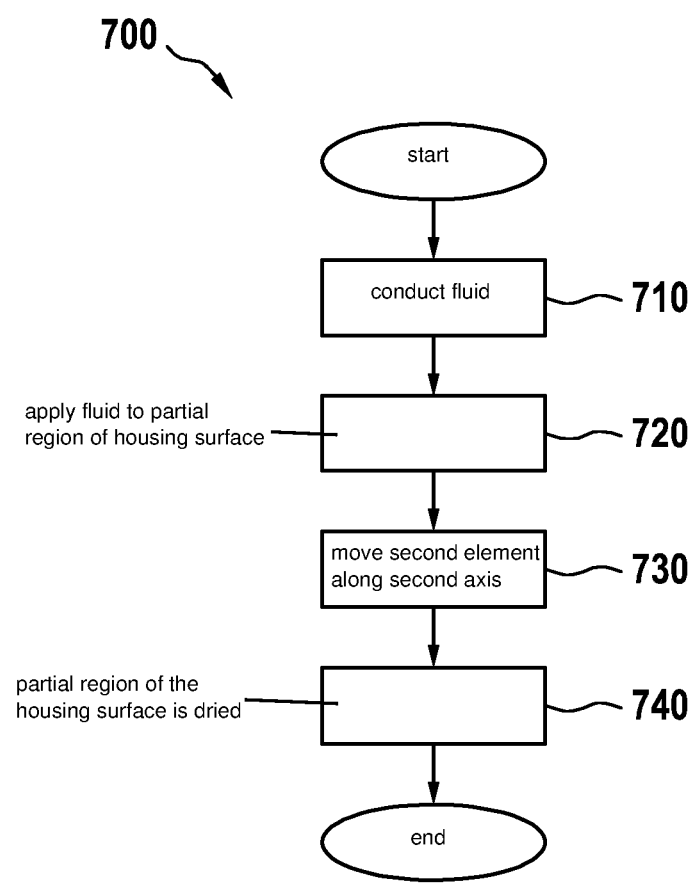
FIG. 7 shows a method for cleaning at least a partial region of a housing surface, in accordance with an example embodiment of the present invention.

FIG. 7 shows a method 700 for cleaning a partial region of a housing surface. Method 700 starts with step 710 in which a fluid is conducted between a first means and a second means so that the first means is bulged in the direction of the symmetrical body. In a following step 730, the second means is moved along a second axis, the second axis being disposed parallel to the first axis. In an optional step 720, which is carried out between step 710 and 730, the fluid is applied to the partial region of the housing surface by way of openings in the first means. In an optional step 740, the partial region of the housing surface is dried by bulging the first means. Method 700 may be started when the vehicle is started, when the vehicle is shut off or when the driver or a control unit provides a command. Method 700 may be started by the control unit if there is a need for cleaning, i.e. if the control unit detects that the glass cover of the sensor, which represents the partial region of the housing surface, is dirty.

What is claimed is:

1. A device for cleaning at least a partial region of a housing surface, the device comprising:
 a first structure having an outer surface and an inner surface, the outer surface of the first structure being situated opposite to the inner surface of the first structure, the inner surface of the first structure being configured to be disposed on the partial region of the housing surface; and
 a second structure having an outer surface and an inner surface, the outer surface of the second structure being situated opposite to the inner surface of the second structure, wherein the inner surface of the second structure is disposed on the outer surface of the first structure, the first structure being deformable along a first axis by a fluid which is able to be conducted between the first structure and the second structure, and the second structure being movable along a second axis, the second axis being disposed perpendicular to the first axis.

2. The device as recited in claim 1, wherein the first structure is at least a partial ring.

3. The device as recited in claim 1, wherein the first structure includes at least one opening out of which the fluid flows.

4. The device as recited in claim 3, wherein the at least one opening is positioned acentrically.

5. The device as recited in claim 3, wherein the at least one opening includes a nozzle.

6. The device as recited in claim 1, wherein the first structure is configured to be disposed between (i) the partial region of the housing surface and (ii) the second structure, with (a) the inner surface of the first structure facing towards the partial region of the housing surface, (b) the outer surface of the inner structure facing away from the partial region of the housing surface and towards the inner surface of the second structure, and (c) the outer surface of the second structure facing away from the partial region of the housing surface and from the first structure.

7. The device as recited in claim 1, wherein the deformation by which the first structure is deformable is by a pressure of the fluid causing a region of first structure to bulge towards the partial region of the housing surface.

8. The device as recited in claim 1, wherein, when the first structure is disposed on the partial region of the housing surface, the first structure is arranged, along the first axis, radially between the second structure and the partial region of the housing surface.

9. An optoelectronic sensor, comprising:
a housing;
an optoelectronic sensor situated in the housing, a housing surface of the housing having at least a partial region that is permeable to light of the optoelectronic sensor; and
a device for cleaning the at least the partial region of the housing surface, the device including:
a first structure having an outer surface and an inner surface, the outer surface of the first structure being situated opposite to the inner surface of the first structure, the inner surface of the first structure be disposed on the partial region of the housing surface; and
a second structure having an outer surface and an inner surface, the outer surface of the second structure being situated opposite to the inner surface of the second structure, wherein the inner surface of the second structure is disposed on the outer surface of the first structure, the first structure being deformable along a first axis by a fluid which is able to be conducted between the first structure and the second structure, and the second structure being movable along a second axis, the second axis being disposed perpendicular to the first axis.

10. The optoelectronic sensor as recited in claim 9, wherein the second structure is connected to a drive device configured to move the second structure along the second axis.

11. A vehicle, comprising:
a device for cleaning at least a partial region of a housing surface, the device including:
a first structure having an outer surface and an inner surface, the outer surface of the first structure being situated opposite to the inner surface of the first structure, the inner surface of the first structure being able to be disposed on the partial region of the housing surface; and
a second structure having an outer surface and an inner surface, the outer surface of the second structure being situated opposite to the inner surface of the second structure;
wherein the inner surface of the second structure is disposed on the outer surface of the first structure, the first structure is deformable along a first axis by a fluid which is able to be conducted between the first structure and the second structure, and the second structure (i) is movable along a second axis that is perpendicular to the first axis and (ii) is disposed on a roof of the vehicle or hidden in the roof of the vehicle.

12. The vehicle as recited in claim 11, wherein the second structure is connected to a drive device configured to move the second structure along the second axis.

13. A method using a device for cleaning at least a partial region of a housing surface, wherein the device includes (i) a first structure having an outer surface and an inner surface, the outer surface of the first structure being situated opposite to the inner surface of the first structure, the inner surface of the first structure being configured to be disposed on the partial region of the housing surface and (ii) a second structure having an outer surface and an inner surface, the outer surface of the second structure being situated opposite to the inner surface of the second structure and the inner surface of the second structure being disposed on the outer surface of the first structure, the method comprising the following steps:
conducting a fluid between the first structure and the second structure so that the fluid deforms the first structure along a first axis, the deformation being a bulging of the first structure in a direction of the partial region of the housing surface; and
moving the second structure along a second axis, the second axis being disposed perpendicular to the first axis.

14. The method as recited in claim 13, further comprising the following steps:
applying the fluid onto the partial region of the housing surface via openings in the first structure; and
drying the partial region of the housing surface by bulging the first structure.

* * * * *